United States Patent
O'Mahony

[11] Patent Number: 6,134,753
[45] Date of Patent: Oct. 24, 2000

[54] EYEGLASS HOLDER

[76] Inventor: Sean Patrick O'Mahony, 312 Dodge Ave., Jefferson, La. 70121

[21] Appl. No.: 08/976,727

[22] Filed: Nov. 24, 1997

Related U.S. Application Data

[63] Continuation-in-part of application No. 08/388,818, Feb. 15, 1995, Pat. No. 5,794,312.

[51] Int. Cl.7 .................................................. A44B 21/00
[52] U.S. Cl. ............................................................... 24/3.3
[58] Field of Search .............................. 24/3.3, 3.11, 326, 24/327, 329, 331, 332, 334, 335, 338, 510, 564; 224/312, 247, 269; 248/902, 229.13, 229.16, 229.23, 229.26, 231.51, 231.81; 351/155

[56] References Cited

U.S. PATENT DOCUMENTS

| | | |
|---|---|---|
| 556,209 | 3/1896 | Quinn . |
| 760,040 | 5/1904 | Tatum . |
| 2,654,132 | 10/1953 | Norcross ................. 24/332 X |
| 4,715,575 | 12/1987 | Kamerer . |
| 4,949,432 | 8/1990 | Wisniewski ................. 24/3.3 |
| 5,183,191 | 2/1993 | Garrison et al. ................. 24/564 X |
| 5,408,728 | 4/1995 | Wisniewski ................. 24/3.3 |
| 5,573,167 | 11/1996 | Bebb et al. ................. 224/247 X |
| 5,794,312 | 8/1998 | O'Mahony ................. 24/3.3 |

Primary Examiner—James R. Brittain

[57] ABSTRACT

A holder for eyeglasses and the like is provided. The holder is designed to be attached to articles of clothing, clothing accessories, automobile visors, or other areas whereby it is available for conveniently receiving and retaining a pair of eyeglasses. The eyeglass holder desirably can be rotated for awkward areas of attachment, or convenient areas of placement such as a purse strap. The holder can desirably have a releasable cover for a wearer to have a variety of choices of holder aesthetics. The holder broadly comprises of a clip or a pin, pivot, and hook arrangement; a cylindrical connection or a slit and guide connection; and a frontal elongate plate member pivotally mounted onto a base member with perpendicular or inwardly bent clips to maintain a gap for eyeglass temples; and, optionally, a removable cover.

19 Claims, 5 Drawing Sheets

FIG. 1A
FIG. 1B
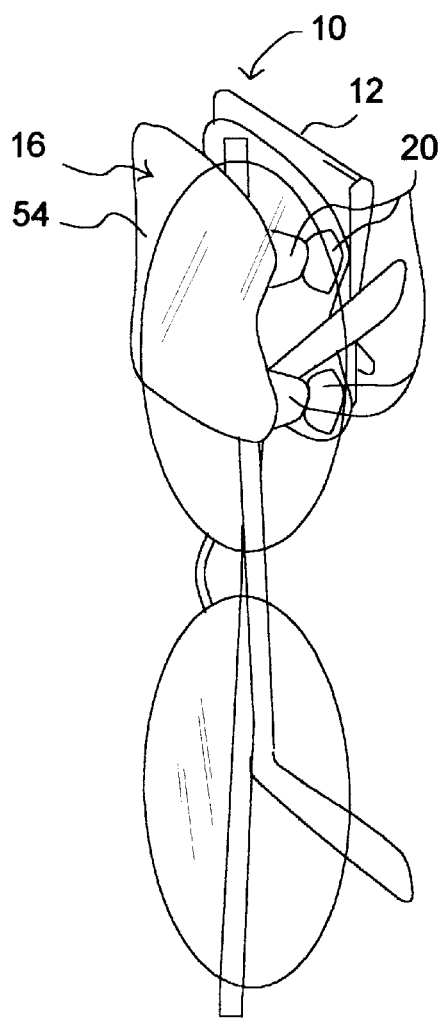
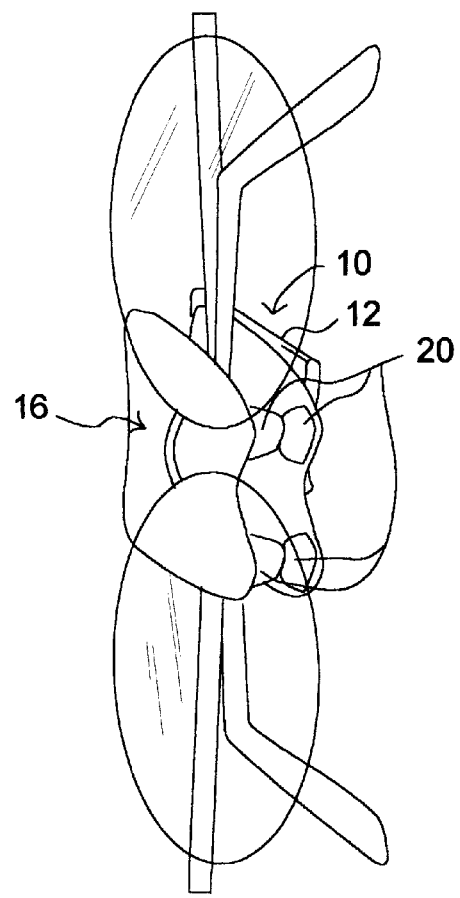

EYEGLASS HOLDER

This application is a Continuation-in-Part of the application Ser. No. 08/388,818, filed Feb. 15, 1995 now U.S. Pat. No. 5,794,312.

BACKGROUND

1. Field of Invention

The present invention generally relates to a holding device. More particularly, the present relates to a holding device for eyeglasses that can be attached to clothing, such as a shirt pocket, clothing accessories, such as waist belts or purse straps, and flat surfaces, such as automobile visors.

2. Description of Prior Art

Many people have poor vision requiring them to wear eyeglasses or spectacles. For these people it is frequently convenient to take their eyeglasses off and place them in a pocket. This is particularly true for those who are required by law to wear prescription eyeglasses while operating a vehicle but prefer to take them off and carry them when no longer operating the vehicle. Also, people generally pay high prices for designer sunglasses and prescription eyeglasses and then are forced to hide them in a pocket or in a purse when not in use. Lastly, people wearing sunglasses frequently take them off once indoors or leave them inside the automobile while not driving.

Whether putting one's primary eyeglasses, a pair of sunglasses, or extra glasses in a pocket is convenient; there are associated problems. The most obvious problem is that if the glasses are not held securely in a shirt pocket, they will fall out and break. Further, it would be advantageous if the eyeglasses could be held in a selected position or location such as outside a shirt pocket, thereby increasing the ease of access, preventing them from moving around (particularly while engaged in sporting events), and still display the expensive appeal.

The problem identified in the preceding paragraph is well known, particularly to those who use eyeglasses of various sorts. Various types of eyeglass holders have been disclosed in the prior art purporting to solve the problem. In U.S. Pat. No. 305,185 to Hawkes an eyeglass case having a clothing fastening means attached thereto is shown. Cases, however, are extremely bulky for a wearer to carry. In U.S. Pat. No. 556,209, Quinn designed a combined pencil holder and clip that could also secure glasses. While this invention is an improvement from bulky cases, Quinn's invention has numerous problems expected from an invention not necessarily designed for glasses. First, Quinn's holder does not provide an area to preposition the temple pieces before inserting the glasses, so two hands are always needed to insert the glasses. Second, the prongs on the front plate must be large enough to hold a pencil. This increases the clearing distance needed from the nose piece of eyeglasses to the front plate when glasses are inserted thereby reducing the types of eyeglasses that can fit into the holder. Third, Quinn's holder specifies a pivotal connection on the upper end of the back plate. This design is a problem because it extends the entire design length of the holder and it increases the amount of strength needed by the pivot and the garment to hold the eyeglass clasp in a 90° position to the garment clasp when the weight of glasses are held. As a result, the glasses will have a tendency to hang in a 45° position when attached to a wearer. Fourth, both the clasp for the eyeglasses and the clasp for the garment are positioned opposite of each other in a manner such that the direction of force to open both of the clasps is also opposite of each other. If a wearer attaches the holder onto their garment, then presses one clasp to insert their glasses, the same force can also open the garment clasp as it rests against the wearer causing the holder and the glasses to fall with subsequent damage to the glasses. Lastly, the prongs to hold pencils can scratch the glass lenses. A wearer with a holder designed for eyeglass holder should not encounter all these serious problems when storing their glasses.

Other configurations were developed to hold eyeglasses such as holders that engage the bridge of a pair of eyeglasses. Exemplary of this type of eyeglass holders are U.S. Pat. No. 727,204 to Rogers: U.S. Reissue Pat. No. 12,771 to Dripps; U.S. Pat. No. 2,637,080 to Nemser; and U.S. Pat. No. 2,876,513 to McIntosh. Eyeglass holders substantially formed from wire frame members have also been disclosed in prior art. U.S. Pat. No. 171,681 to Meyer discloses a wire frame having paired clamp hooks which engage the lens frames of the eyeglasses. U.S. Pat. No. 730,633 to Jordan discloses an eyeglass holder having a bent hook attached to a hairpin. In U.S. Pat. No. 3,956,795 to Kosakai an ornamental brooch having a slidably mounted wire frame attached to the rear surface of the brooch and extending downwardly for receipt of the temples of eyeglasses is shown. A curved wire frame eyeglass holder having end loops that engage the temples of eyeglasses is disclosed in U.S. Pat No. 4,458,384, to Arnold. A further example of the prior art is shown in U.S. Pat. No. 2,818,621 to Pretz where an eyeglass holder having a tubular member pivotally disposed below an ornamental pin for receipt of the temple of eyeglasses is disclosed. A large case opened by releasing a center latch arm is disclosed in Kamerer, U.S. Pat. No. 4,715,575. However, unlike Hawkes case which is designed to wear on a garment, Kamerer's case is much bulkier and designed to attach to a "support structure such as the instrument panel of a car or boat or sunvisor of a car for storage of the eyeglasses when not in use." Kamerer's holder isn't designed for temporary holding such as walking in and out of stores while shopping and temporarily attaching and removing sunglasses or eyeglasses to a garment. Eyeglass holders that engage the temple of an eyeglass by means of a moveable grip and a stationary grip are shown in U.S. Pat. No. 4,771,515 to Guarro. An eyeglass holder having a vertical transverse cross-section holding means to engage one temple piece is disclosed in U.S. Pat No. 5,033,612 to Bivins. Eyeglasses held by only one temple piece can easily flap up and down, especially while walking at a brisk pace, causing damage to the temple piece. Eyeglass holders with an actuating clamp to engage a temple piece is disclosed in U.S. Pat. No. 5,351,098 to McDaniels. Wisniewski attempts designing eyeglass holders in U.S. Pat. Nos. 4,949,432 and 5,408,728 that could engage both temple bars. However, these designs have several serious problems. The gap where the temple pieces are inserted cannot be pressed open prior to inserting the temple pieces. Rather the temple pieces must be forced into the holder which not only can wear down the expensive temple pieces, but also can wear out the effectiveness of the holding plates. Worse yet, the wearer has to attempt the complex contortion of reaching around the holder for leverage on one end while trying to push through the eyeglass temples into the other end and, very possibly only succeeding in pushing the holder out of the garment. The situation worsens with eyeglasses that have temple pieces located midway between the lenses.

More recently, in U.S. Pat. No. 5,491,878, Janouschek introduces a holder that clamps the lens frames of glasses acting more like a semi-versatile version of the bulky case. In U.S. Pat. No. 5,613,661, Seach introduces another one-temple holding clip reverting back to the same problems mentioned in the preceding paragraph about Bivins' holder.

Objects and Advantages

As can be seen from the foregoing, numerous devices have been considered to provide means for temporarily holding a pair of eyeglasses to clothing and the like. However, these devices of the prior art do not provide the advantages of the present invention. For an eyeglass holder to be most effective during almost any activity, it must be capable of simultaneously securing both temple pieces to prevent flapping of the eyeglasses which can damage the temple hinges while still engaged by the eyeglass holder. The holder should have a flat-like or bent-in area to preposition the temple bars before opening the holder. This feature makes it possible for inserting eyeglasses without looking down at the holder. A prepositioning area makes it possible to insert glasses with one hand. Additionally, the gap for receiving the temple pieces should easily widen by simply pressing on the front plate prior to receiving the temple clips, and without obstructions such as jutting pencil claws, to facilitate insertion. Additionally, when depressing the holder to open it, the wearer should not have to worry about opening the garment fastener also, and dropping the holder. Securing both temple pieces should further prevent slipping out from the holder which can break the glasses. The eyeglass holder should be capable of receiving and securing a variety of eyeglass sizes and styles with minimal effort by the wearer without rejecting styles simply because of the distance between their temple bars and nose pieces. The eyeglass holder desirably should be easily and securely rotational to increase the variety of placement positions of the eyeglass holder. If it rotates, the holder should have proper balancing so the glasses hang appropriately on the garment. Since the wearer usually displays the eyeglass holder, it should provide an aesthetic appeal such as jewelry, and desirably, a means for changing the eyeglass holders' appearance as the wearers clothes and jewelry change. The eyeglass holder also should be inexpensive to manufacture. All these requirements are the objects and advantages fulfilled by the eyeglass holder of the present invention. Further advantages of the invention will become apparent from a consideration of the drawings and ensuing description.

DRAWING FIGURES

In the drawing figures, closely related figures have the same number but different alphabetic suffixes.

FIGS. 1A to 1B show an eyeglass holder securing eyeglasses by both temple pieces.

Reference Numerals in Drawings

| | | | |
|---|---|---|---|
| 10 | Article Fastening Means | 42 | Urging Means |
| 12 | Spring Clip | 44 | Shaft |
| 14 | Base | 46 | Torsion Spring |
| 16 | Temple Holding Means | 48 | Fastening Lug |
| 18 | Temple Clip | 50 | Parallel Fastening Lug |
| 20 | Clip End | 52 | Locking Ring |
| 21 | Longer Clip End | 54 | Plate |
| 22 | Face | 56 | Compressible Supporting Element |
| 24 | Gap | 58 | Extended Shaft End |
| 26 | Opening | 60 | Receiver |
| 28 | Cover | 62 | Rails |
| 30 | Connection | 64 | Snap |
| 32 | Recess | 66 | Cut-outs |
| 34 | Nodule | 68 | Notch |
| 36 | Pivot | 70 | Resistance Arm |
| 38 | Pin | 72 | Resistance Arm Clip |
| 39 | Hook | 74 | Binder Clip |
| 40 | Guides | 76 | Clip Arm |
| 41 | Slits | 78 | Extruded Hinge |

DESCRIPTION

FIG. 1A and 1B illustrate a preferred embodiment of an eyeglass holder of the present invention securing glasses by both temple bars.

Figure 1C:
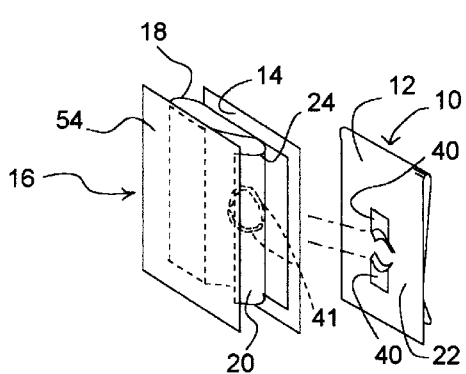
FIGS. 1C to 1F show an eyeglass holder with alternate embodiments of a temple holding means using S-shaped and U-shaped clip configurations.

FIG. 1C illustrates in a perspective view a preferred embodiment of an eyeglass holder of the present invention. The holder, as all embodiments in all other figures, may be formed from many different materials or combination thereof. It is anticipated that either a metal may be used, such as silver, or a resilient plastic may be used for economic reasons. As all other holders depicted, the holder comprises of an article fastening means 10 and a temple holding means 16. In FIG. 1C, article fastening means 10 is depicted as a spring clip 12, such as a money clip, having a generally rectangular side, face 22, attached to temple holding means 16. Spring clip 12 may be attached directly to temple holding means 16 by any suitable means, such as spot welding, soldering, or gluing. However, in the illustration, spring clip 12 is attached to temple holding means 16 by the addition of guides 40 inserted through slits 41 giving temple holding means 16 an optional rotational capability. Temple holding means 16 is depicted as temple clip 18 extending along base 14. Temple clip 18 is generally S-shaped attached to base 14 with clip end 20 extending perpendicularly towards plate 54 for attachment. This forms lateral gap 24 near base 14 along a side of the holder for eyeglass temple prepositioning and insertion. Temple clip 18 is attached to plate 54 by any means as previously mentioned including gluing, insert molding, or even injection molding. Although plate 54 may take any variety of shapes and sizes for ascetic appeal as depicted in other figures, plate 54 is generally rectangular in shape having a flat-like surface for attachment of temple holding means 16 and small enough to allow the simultaneous insertion of both eyeglass temples of a set of folded eyeglasses through gap 24 without obstruction to eyeglass lenses or hinges. Operation of all the depicted eyeglass holders are accomplished by attaching the article attachment means 10 onto the top edge of a typical pocket, purse strap, belt, etc. With both eyeglass temples in a folded position, the eyeglass temples are pre-positioned against gap 24. Then, plate 54 is depressed on a side opposite of gap(s) 24 and both eyeglass temples are inserted simultaneously through gap(s) 24. Because the temples can be pre-positioned, the wearer can insert the temple pieces without looking down at the holder. Another benefit of this design is the eyeglasses easily can be inserted with just one hand. Also, because both eyeglass temples now can be secured instead of just one temple, flapping of the eyeglasses against a wearer's chest is prevented. Thus, temple hinge damage and constant repositioning of the second eyeglass temple piece is also prevented. Securing both eyeglass temples is a distinctive advantage of the present invention. Also, the eyeglasses now may be suspended securely, conveniently, and decoratively on a purse strap without excess length causing obstruction to the arm.

Figure 1D:
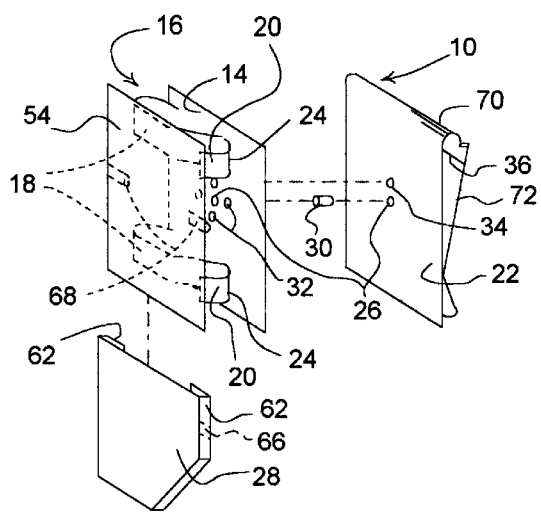

FIG. 1D is substantially the same holder as FIG. 1C, however, FIG. 1D depicts in a perspective view a second embodiment of article fastening means 10 and temple holding means 16. Article fastening means 10 is a resistance arm clip 72 for tight continuous grasping of a garment, especially for thin dress shirt pockets. Referencing FIG. 1G, article fastening means 10 has resistance arm 70 that continuously forces the opposite end of resistance arm clip 72 against face 22 by means of pivot 36. Referencing back to FIG. 1D, article fastening means 10 is attached to temple holding means 16 to allow rotation of temple holding means 16. Face 22 has a centrally positioned opening 26 for receiving a connection 30. Connection 30 may be a small segment of cylindrical piping. Connection 30 is received by a centrally positioned opening 26 on a base 14. Although base 14 may take a variety of shapes and sizes, base 14 is generally rectangular and flat taking the shape and size of face 22. The tightness of base 14 with respect to face 22 is such that, as base 14 were rotated to any position, excessive rotational movement would be prevented. Base 14 and face 22 may be secured onto connection 30 by any suitable means such as widening each end of connection 30 or placing locking rings, not necessarily illustrated, at each end of connection 30. Optionally, face 22 may include one or more nodules 34 near opening 26. Base 14 includes recesses 32 in a cylindrical pattern around opening 26. Recesses 32 receive nodule 34 when face 22 and base 14 are received by connection 30. As base 14 is rotated about connection 30, nodule 34 is received into recesses 32 for consistent repositioning of temple holding means 16 to various angles by the wearer. Temple holding means 16 is depicted as two short S-shaped temple clips 18 extending along base 14. Temple clips 18 are attached to base 14 and plate 54 with clip ends 20 extending perpendicularly towards plate 54. This forms lateral gaps 24 near base 14 along a side of the holder for eyeglass temple insertion. Temple clips 18 are attached to base 14 and plate 54 by any means as previously mentioned including gluing, insert molding, or even injection molding. FIG. 1D depicts an alternate embodiment of an optional cover 28. Cover 28 is an ornamental object that comprises of parallel rails 62 and cut-outs 66 located underneath. Edges underneath plate 54 comprise of notches 68 which are added for cover 28. Cover 28 is received by sliding rails 62 onto the edges of plate 54 and temporarily secured when notches 68 are received by cut-outs 66.

Figure 1E:
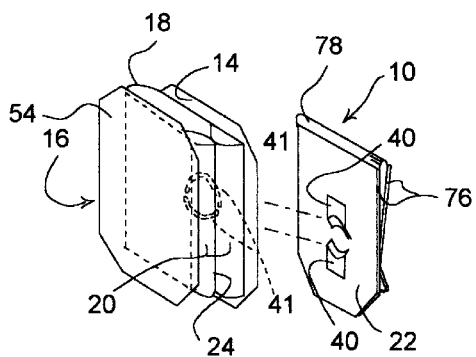

FIG. 1E depicts in a perspective view a third embodiment of article fastening means 10 and temple holding means 16. Clip arms 76 are attached by an extruded hinge 78 for additional strength and durability. Article attachment means 10 is attached to temple holding means 16 by slits 41 and guides 40 as previously mentioned. Temple holding means 16 is depicted as one long U-shaped temple clip 18 extending along base 14. Temple clip 18 is attached to base 14 and plate 54 with clip ends 20 extending perpendicularly towards plate 54 and base 14. This forms one long lateral gap 24 between base 14 and plate 54 for eyeglass temple insertion. Temple clip 18 is attached to base 14 and plate 54 by any means as previously mentioned including gluing, insert molding, or even injection molding. Plate 54 and base 14 are depicted as octagonal in shape for aesthetic reasons.

Figure 1F:
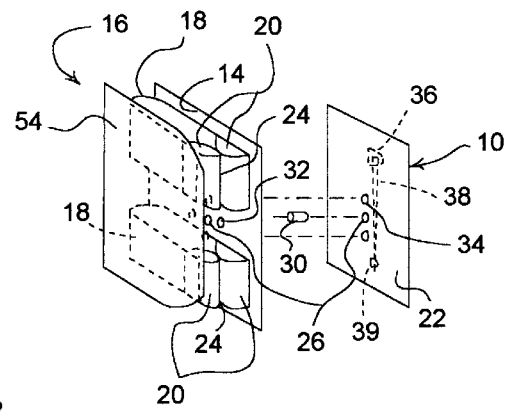
Figure 1G:
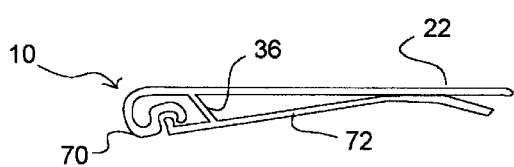
FIG. 1G shows an alternate embodiment of an article attachment means.

FIG. 1F depicts in a perspective view a fourth embodiment of article fastening means 10 and temple holding means 16. Article fastening means 10 comprises of a pivot 36, a pin 38, and a hook 39 attached to the opposite side of face 22. Article fastening means 10 is attached to base 14 as previously mentioned using connection 30, openings 26, nodule 34, and recesses 32. Temple holding means 16 is depicted as two short U-shaped temple clips 18 extending along base 14. Temple clip 18 is attached to base 14 and plate 54 with clip ends 20 extending perpendicularly towards plate 54 and base 14. This forms two short lateral gaps 24 between base 14 and plate 54 for eyeglass temple insertion. Temple clip 18 is attached to base 14 and plate 54 by any means as previously mentioned including gluing, insert molding, or even injection molding. Plate 54 and base 14 are different shapes for aesthetic reasons.

Because construction of article fastening means 10 and its method of attachment to base 14, whether or not rotational, of the present invention has already been described in detail for FIGS. 1C through 1G as a spring clip, a resistance arm clip, a clip with an extruded hinge, or a pivot, pin, and hook arrangement, the remaining figures, FIGS. 2A through 4D, will reference these substantially same embodiments in general. Additionally, an article fastening means may consist of numerous other devices such as an elongated pin and pin-cover arrangement or a leather strap and button arrangement. Further descriptions presenting these embodiments are common to the art and not deemed instructive.

Figure 2A:
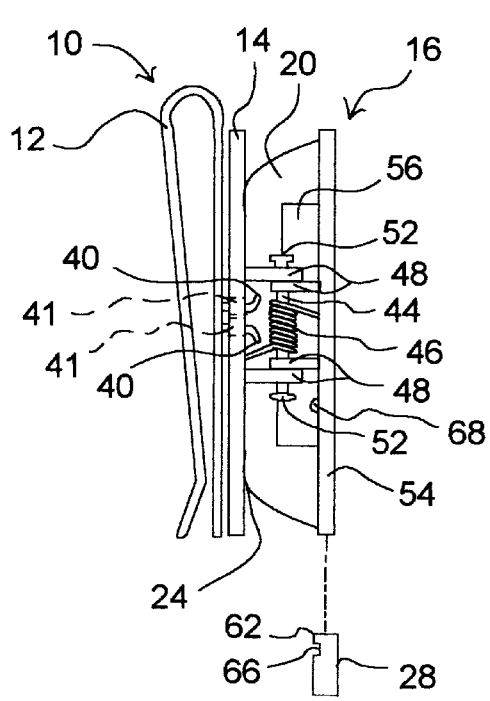
FIGS. 2A to 2D show an eyeglass holder with alternate embodiments of a temple holding means using torsion spring configurations.

FIG. 2A depicts a fifth embodiment of temple holding means 16. Temple holding means 16 comprises of plate 54 and base 14 forced together by a torsion spring 46 pivotally mounted on a shaft 44. Shaft 44 is received through holes in fastening lugs 48 that are attached to base 14 and plate 54. Shaft 44 may be secured by means such as locking ring 52 or flattening the ends of shaft 44. Clip end 20 extends from near the top of base 14 and plate 20 to near the bottoms. Clip end 20 extends outward from plate 54 towards base 14 then back inward towards plate 54 as similarly depicted in FIG. 1C. Clip end 20 can be attached to either base 14 as shown in FIG. 1C or plate 54 as shown in FIG. 2A. Clip end 20 is attached to plate 54 by any means as previously mentioned including gluing, insert molding, or even injection molding. Clip end 20 may also be composed of a compressible supporting element such as foam or rubber that is removable and attachable to adjust for large variations in temple width of various glasses. Article attachment means 10 is a spring clip 12 attached to base 14 by slits 41 and guides 40 as previously mentioned. Cover 28 is optionally attached to plate 54 as previously mentioned.

Figure 2B:
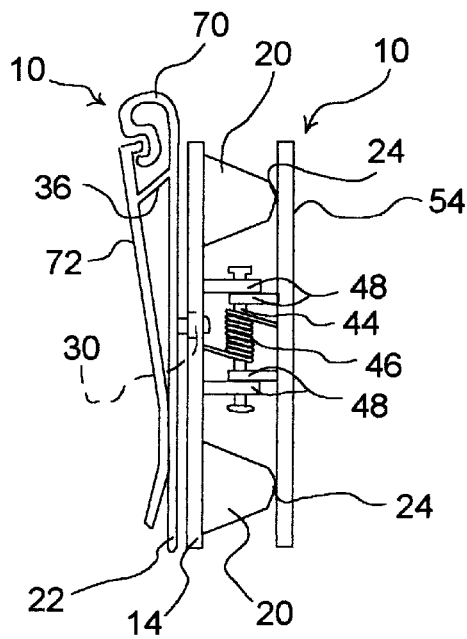

FIG. 2B depicts in an alternate embodiment of the holder using parts previously discussed. Temple holding means 16 comprises of plate 54 and base 14 forced together by a torsion spring 46 pivotally mounted on a shaft 44. Shaft 44 is received through holes in fastening lugs 48 that are attached to base 14 and plate 54. Shaft 44 may be secured by means such as locking ring 52 or flattening the ends of shaft 44. One clip end 20 extends from near the top of base 14 outwards towards plate 54 then downwards along plate 54 ending towards the center base 14. A second clip end 20 extends from the center of base 14 outwards towards plate 54 then downwards along plate 54 ending towards the bottom of base 14. This forms two short lateral gaps 24 for temple insertion. The clip ends are similarly depicted in FIG. 1D. Clip ends 20 can be attached to either base 14 as shown in FIG. 2B or plate 54 as shown in FIG. 1D. Clip end 20 is attached to plate 54 by any means as previously mentioned including gluing, insert molding, or even injection molding. Clip end 20 may also be composed of a removable/attachable compressible supporting element such as foam or rubber. Article attachment means 10 is a resistance arm clip 72 attached to base 14 by connection 30 configuration as previously discussed.

Figure 2C:
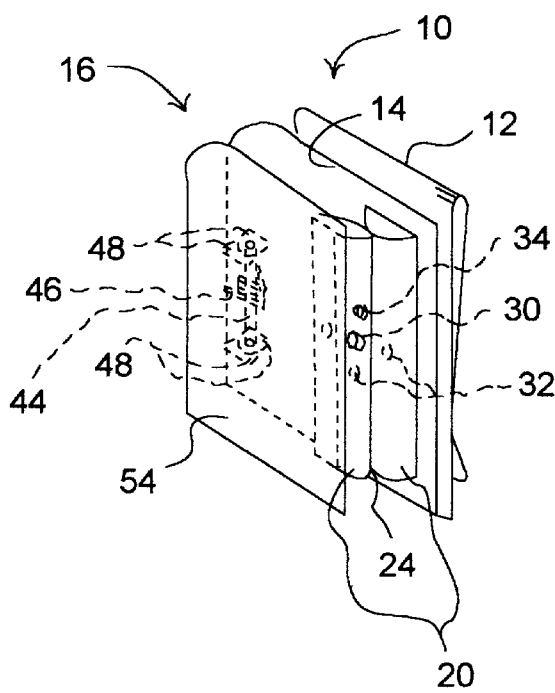

FIG. 2C depicts an alternate embodiment of the holder using parts previously discussed. Temple holding means 16 comprises of plate 54 and base 14 forced together by a torsion spring 46 pivotally mounted on a shaft 44. Shaft 44 is received through holes in fastening lugs 48 that are attached to base 14 and plate 54. Shaft 44 may be secured by means such as locking ring 52 or flattening the ends of shaft 44. Two clip ends 20 extend from near the top of base 14 and plate 54 outwards towards each other downwards ending towards the bottom of base 14 and plate 54. This forms one long lateral gap 24 for temple insertion. The clip ends are similarly depicted in FIG. 1E. Clip ends 20 are attached to plate 54 and base 14 by any means as previously mentioned including gluing, insert molding, or even injection molding. Clip end 20 may also be composed of a compressible supporting element such as foam or rubber. Article attachment means 10 is a spring clip 12 attached to base 14 by connection 30 configuration as previously discussed.

Figure 2D:
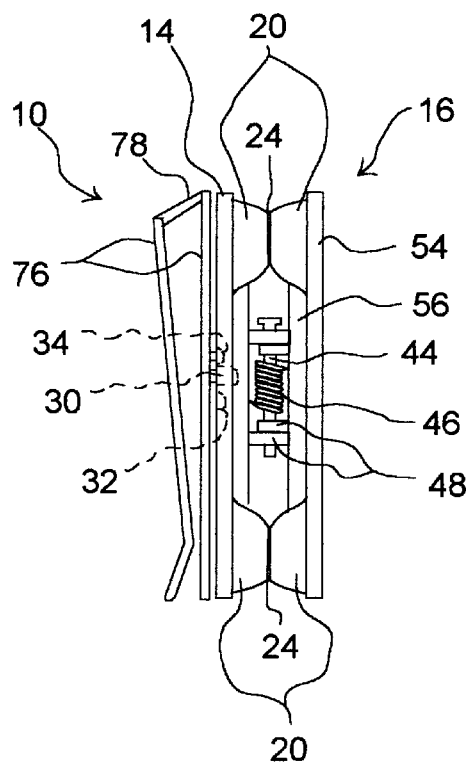

FIG. 2D depicts in an alternate embodiment of the holder using parts previously discussed. Additionally, FIG. 2D introduces an optional, removable/attachable compressible supporting element 56 that may be attached to either base 14, plate 54, or both in any of the invention embodiments. In FIG. 2D, compressible supporting element 56 is attached to base 14 and plate 54 in a linear, face-to-face manner extending from the top of base 14 to the bottom of base 14, and the top of plate 54 to the bottom of plate 54. The width of compressible supporting element 56 extends generally from the edge of the urging means, depicted as the edge of fastening lugs 48 in FIG. 2D, to near the edges of clip ends 20. The width of compressible supporting element 56 can also be extended to wrap from clip end 20 to the urging means and back to clip end 20 as one piece in a folded fashion depicted in FIG. 4C. Compressible supporting element 56 can be made of foam, rubber, or other compressible material. It should have a sticking on at least one side that allows it to adhere to base 14 or plate 54 for normal wear, and still be easily removed. An example of similar readily available material is removable weather stripping. Compressible supporting element 56 prevents jiggling of the eyeglasses while in the holder. Clip ends 20 are as described in FIG. 1F in which two clip ends 20 extend from near the top of base 14 and plate 54 outwards towards each other downwards ending towards the center of base 14 and plate 54. Two additional clip ends 20 extend from the center of base 14 and plate 54 outwards and downwards towards the bottom of base 14 and plate 54. This forms two short lateral gaps 24 for temple insertion. Clip ends 20 are attached to plate 54 and base 14 by any means as previously mentioned including gluing, insert molding, or even injection molding. Clip end 20 may also be composed of a compressible supporting element such as foam or rubber.

Figure 3A:
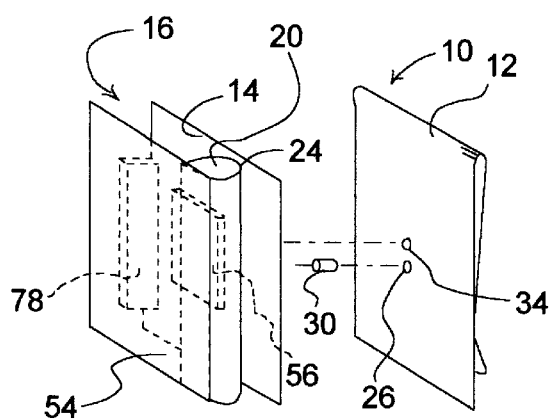
FIGS. 3A to 3D show an eyeglass holder with alternate embodiments of a temple holding means using extruded hinge configurations.
Figure 3B:
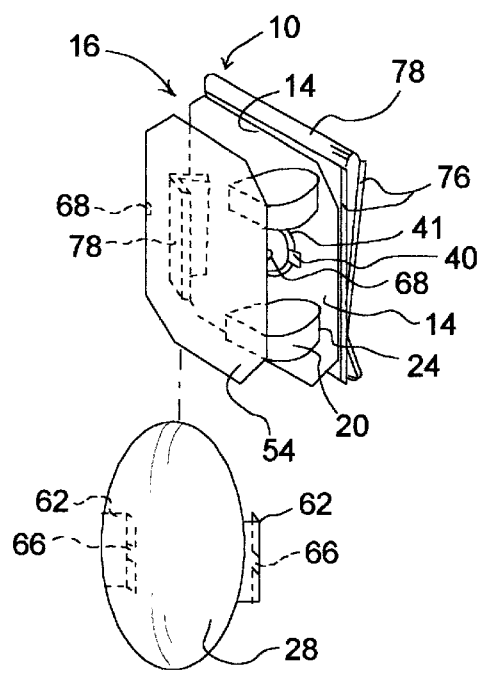
Figure 3C:
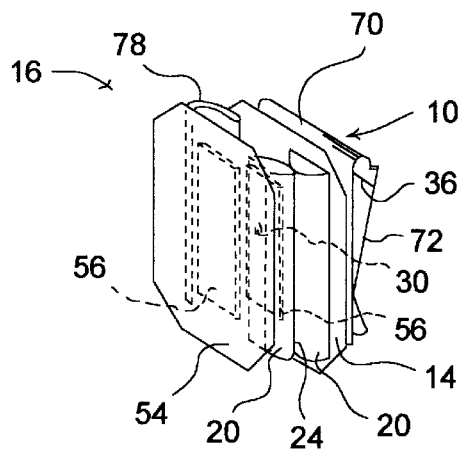
Figure 3D:
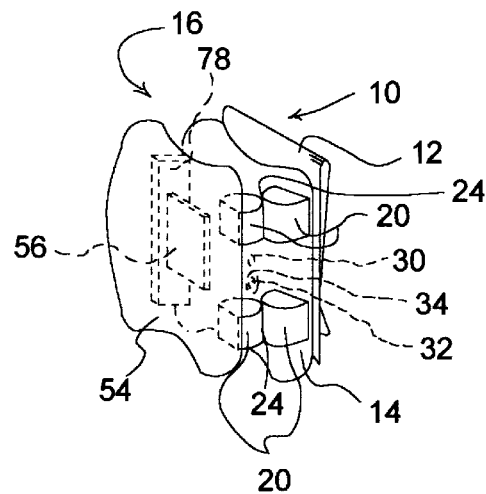

FIGS. 3A and 3D depict alternate embodiments of a holder using parts previously discussed. However, FIGS. 3A and 3D use a flat extruded hinge 78 to urge plate 54 towards base 14. Extruded hinges are generally formed from polypropylene plastics, or a combination of other plastics which can withstand many flexures, reference U.S. Pat. No. 4,563,381 to Woodland. Extruded hinge 78 extends linearly and perpendicularly down base 14 and plate 54. Extruded hinge 78 is a flexible plastic that can withstand many flexures to open gap 24. Extruded hinge 78 is attached to base 14 and plate 54 typically by gluing, injection molding, or insert molding. Base 14 and plate 54 in FIG. 3D are oddly shaped as another example of aesthetics.

FIGS. 3B and 3C depict an alternate embodiments of a holder using parts previously discussed. However, extruded hinge 78 in FIG. 3B is V-shaped and extruded hinge 78 in FIG. 3C is U-shaped. In FIG. 3B, cover 28 is a circular-shaped ornamental object with a rails 62 and cut-outs 66 that slide onto notches 68 as previously discussed.

Figure 4A:
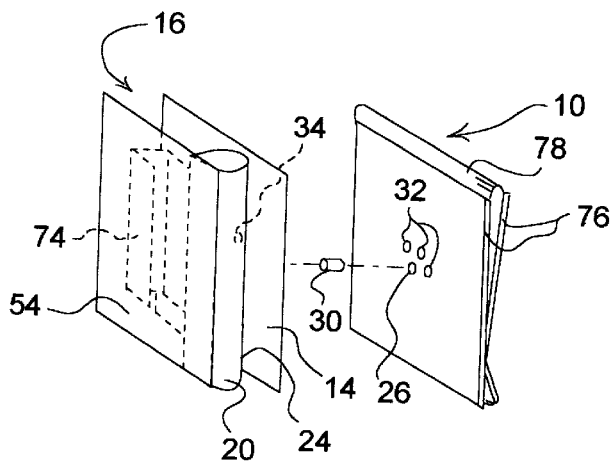
FIGS. 4A to 4D show an eyeglass holder with alternate embodiments of a temple holding means using binder clip configurations.
Figure 4B:
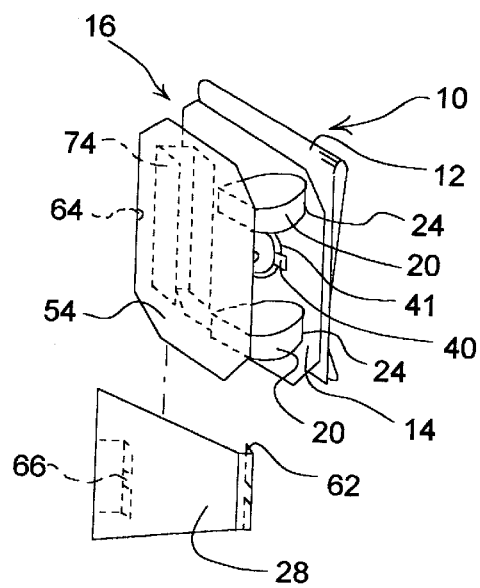
Figure 4C:
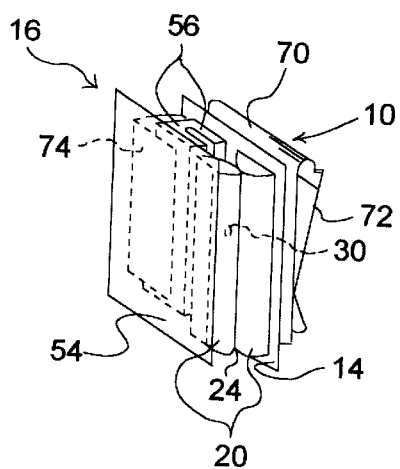
Figure 4D:
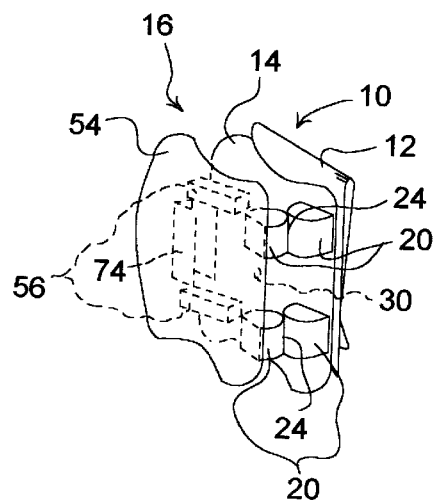

FIGS. 4A through 4D depict alternate embodiments of a holder using parts previously discussed. However, FIGS. 4A through 4D use a binder clip 74 to urge plate 54 towards base 14. Binder clip 74 has generally three flat sides. One side is attached within base 14 and one side is attached within plate 54 typically by soldering, gluing, insert-molding, or injection molding. Binder clip 74 is formed so that its side perpendicular of base 14 and plate 54 is slightly bent inward towards clip end(s) 20 causing a constant urge of plate 54 toward base 14. In FIG. 4B, cover 28 is attached to plate 54 by adding a snap 64 on plate 54 so cover 28 can be snapped onto temple holding means 16.

The attachment means for a cover onto a temple holding means has been presented as a slide-on. Numerous other cover attachment means may be employed to accomplish this interchangeable-cover advantage of the invention, such as: an adhesive pad arrangement; a releasable hinge and snap arrangement; or a flattened hook and détente arrangement. Further descriptions presenting these embodiments are common to the art and not deemed instructive.

The shapes, sizes, and designs of the cover arrangement are only limited by the imagination. The cover is an advantage of the present invention since the cover conceals the mechanical aesthetics of the holder and provides an area for inscriptions, logos, jewelry, and the like. A wearer may attach a diamond-shaped, gem-studded silver cover to aesthetically match a silver watch. The next day, the wearer may attach a gold, cat-shaped cover to match a set of gold earrings. Thus, the wearer may have several covers for various outfits and need only one eyeglass holder.

Although the descriptions above contain many specifications, these should not be construed as limiting the scope of the invention but as merely providing illustrations of the presently preferred embodiments of this invention. Additionally, note that there are many combinations that are recognized from the different parts presented in this invention. For example, any of the temple holding means presented could be attached to any of the article attachment means presented by any of the means mentioned or presented such as soldering, slits and guides configuration, or connections, recesses, and nodules configuration, or parts thereof. The temple holding means could be assembled using any combination of base 14 and plate 54 with a pivotally mounted force mentioned, such as the torsion spring configuration, along with any shape of clip end(s) mentioned. Although optional, the cover assembly with any necessary attachment mechanisms, such as notch 68, could be used with any of the temple holding means. The optional removable compressible supporting element could be used with any of the temple holding means mentioned in any configuration displayed in the figures. Also, any of the clip ends may be composed of a compressible supporting material with such material being readily removable and attachable. Also, any of the rotational means described can be used to connect any of the article attachment means to any of the temple holding means described.

What is claimed is:

1. A holder for supporting and securing objects such as eyeglasses, by encircling and/or grasping one or a plurality of temples, said holder formed from resilient material, said holder comprising:
   a) a frontal plate member essentially having a front face and a rear face, said frontal plate member having essentially an upper edge, a lower edge, a left edge, and a right edge, said plate member being essentially flat whereby said frontal plate member accommodates a variety of temple bars minimizing obstruction to eyeglass nosepieces;
   b) a base member pivotally mounted on said frontal plate member generally extending along the rear face of said frontal plate member in a parallel, spaced apart, face-to-face relationship therewith, said base member terminating near said edges of said frontal plate member;
   c) a material defining one or more linear members of constant thickness perpendicularly or inwardly bent and positioned between said frontal plate member and said base member whereby said material encloses a gap between said frontal plate member and said base member for encircling and/or grasping one or a plurality of eyeglass temples of said eyeglasses whereby outwardly separating said material produces a substantially spaced apart gap for inserting or removing said temples of said eyeglasses;
   d) one or more removable attachable compressible materials attached to said rear face of said frontal plate and/or said corresponding opposing front face of said base member and whereby said compressible material securely grasps said temple bars preventing jiggle of said eyeglasses and protecting said temple bars from scratch or damage;
   e) an urging means bearing mutually with said frontal plate member and said base member whereby a frontal side of a member may be pressed separating said material and producing said substantially spaced apart gap and whereby said frontal side may be released to allow closure of said material producing said securely encircling gap; and,
   f) an article attachment means comprising of a side generally attached to said base member on a side opposite to said frontal plate member to attach said holder to clothing and the like.

2. The holder of claim 1 wherein said article attachment means is a spring clip comprising of a generally planar leg extending in a U-shaped direction abreast and concentric to one face of said planar leg to facilitate inserting securely a garment or similar object whereby said generally planar leg is attached to said base member on a side opposite to said frontal plate member.

3. The holder of claim 1 wherein said article attachment means comprises of a pin, a pivot, a hook, and a generally planar face whereby said pivot is perpendicularly mounted on a side of said face and an opposite side of face is attached to said base member on a side opposite to said frontal plate member.

4. The holder of claim 1 wherein said article attachment means is a resistance arm clip comprising of two generally planar legs extending in a direction abreast each other wherein one planar leg consists of a resistance arm bearing against said other planar leg by means of a pivot forcing a side opposite of said resistance arm of said planar leg to bear against said other planar leg.

5. The holder of claim 1 wherein said article attachment means is an extruded clip comprising of two generally planar legs extending in a direction abreast and concentric each other wherein said legs are attached at one end by means of an extruded hinge.

6. The holder of claim 1 further including a rotational attachment means to provide a means to attach said base member to said article attachment means and rotate said base with respect to said article attachment means.

7. The holder of claim 6 whereby said rotational attachment means comprises of semicircular slits encircling a central point on said base member, and generally L-shaped guides extending perpendicularly from said generally planar side of said article attachment means and passing through said semicircular slits for attaching and rotating said base member about said article attachment means.

8. The holder of claim 6 whereby said rotational attachment means comprises of a cylindrical connection and said base member has a centrally located opening and said generally planar side of said article attachment means has a centrally located opening whereby said base member and said article attachment means are connected by said cylindrical connection passing through said openings for attaching and rotating said base member about said article attachment means.

9. The holder of claim 6 whereby said side of said article attachment means flush to said side of said base member has nodules located generally near a central point, and, said side of said base member flush to said side of said article attachment means consists of recesses in a semicircular pattern about a central point of said base member for receiving said nodules and rotating said base member to predetermined angles in respect to said article attachment means.

10. The holder of claim 1 wherein said frontal plate member and said base member each comprise a corresponding pair of concentric holes through which a pivot shaft is inserted to mount said frontal plate member onto said base member.

11. The holder of claim 1 wherein said urging means is a torsion spring bearing mutually against said frontal plate member and said base member for biasing said opposing edge of said frontal plate member towards said corresponding opposing edge of said base member.

12. The holder of claim 1 wherein said urging means is an extruded hinge bearing mutually against said frontal plate member and said base member for biasing said opposing edge of said frontal plate member towards said corresponding opposing edge of said base member.

13. The holder of claim 1 wherein said urging means is a binder clip bearing mutually against said frontal plate member and said base member for biasing said opposing edge of said frontal plate member towards said corresponding opposing edge of said base member.

14. The holder of claim 1 wherein said urging means comprises of one elongate or a plurality of generally S shaped temple clips extending perpendicularly to said left and right edges of said elongate plate member with a free clip end extending generally perpendicularly outward attaching to said rear face of said frontal plate member and resiliently biased and pivotally attached towards said base member by a planar leg of one side of the S-shaped clip whereby said frontal plate member may be pressed on a frontal side opposite of said opposing edge of said frontal plate member widening one elongate or a plurality of lateral gaps on a side of said holder for ease of eyeglass temple insertion and for preventing scratching of eyeglass temples during insertion.

15. The holder of claim 1 wherein said urging means comprises of one elongate or a plurality of generally U shaped temple clips planarly extending along said rear face of frontal plate member and perpendicularly to said left and right edges of said elongate plate member with at least one free clip end forming a generally smaller U shape extending generally perpendicularly outward towards said base member and curving back towards said rear face attaching to said rear face of said frontal plate member and resiliently biased and pivotally attached to said base member by a planar leg of one side of the U-shaped clip with a free clip end generally planarly attaching to said base member whereby said frontal plate member may be pressed on a frontal side opposite of said opposing edge of said frontal plate member widening one elongate or a plurality of lateral gaps on a side of said holder for ease of eyeglass temple insertion and for preventing scratching of eyeglass temples during insertion.

16. The holder of claim 1 further including an ornamental object to partially or fully obstruct mechanical aesthetics of said holder having a side to attach to said front face of said frontal plate member and having a side to provide an area for design aesthetics whereby size and shape of said ornamental object permits insertion of said eyeglass temples into said holder, and a releasable attachment means to temporarily or permanently secure a side of said ornamental object to said front face.

17. The holder of claim 16 wherein said releasable attachment means comprises of rails for sliding said cover onto said frontal plate member.

18. The holder of claim 1 wherein said clip end is constructed from a removable and attachable compressible supporting element to provide a means to adjust for eyeglass temple width and prevent scratching of eyeglass temples during insertion into said holder.

19. A holder for supporting and securing objects such as eyeglasses, by encircling and/or grasping one or a plurality of temples, said holder formed from resilient material, said holder comprising:

a) a frontal plate member essentially having a front face and a rear face, said frontal plate member having essentially an upper edge, a lower edge, a left edge, and a right edge, said plate member being essentially flat whereby said frontal plate member accommodates a variety of temple bars minimizing obstruction to eyeglass nosepieces;

b) a base member pivotally mounted on said frontal plate member generally extending along the rear face of said frontal plate member in a parallel, spaced apart, face-to-face relationship therewith, said base member terminating near said edges of said frontal plate member;

c) a material defining one or more linear members of constant thickness perpendicularly or inwardly bent and positioned between said frontal plate member and said base member whereby said material encloses a gap between said frontal plate member and said base member for encircling and/or grasping one or a plurality of eyeglass temples of said eyeglasses whereby outwardly separating said material produces a substantially spaced apart gap for inserting or removing said temples of said eyeglasses;

d) an urging means bearing mutually with said frontal plate member and said base member; and, e) an article attachment means comprising of a side generally attached to said base member on a side opposite to said frontal plate member whereby said side comprises of a leg generally extending in a U-shaped direction abreast to said base member and terminating on or near said base member whereby said leg facilitates inserting securely a garment, belt, auto visor, or similar object for conveniently storing glasses.

* * * * *